US009415467B2

(12) United States Patent
Liebel et al.

(10) Patent No.: US 9,415,467 B2
(45) Date of Patent: Aug. 16, 2016

(54) METHOD OF AND DEVICE FOR PRODUCING A CONTOUR CUT IN A STRIP OF SHEET METAL

(71) Applicants: Martin Liebel, Alfeld (DE); Thomas Pohl, Grossenseebach (DE); Juergen Schreck, Erlangen (DE); Michael Tolz, Hausen (DE)

(72) Inventors: Martin Liebel, Alfeld (DE); Thomas Pohl, Grossenseebach (DE); Juergen Schreck, Erlangen (DE); Michael Tolz, Hausen (DE)

(73) Assignee: SCHULER AUTOMATION GMBH & CO., KG, Hessdorf (DE)

( * ) Notice: Subject to any disclaimer, the term of this patent is extended or adjusted under 35 U.S.C. 154(b) by 877 days.

(21) Appl. No.: 13/736,493

(22) Filed: Jan. 8, 2013

(65) Prior Publication Data

US 2014/0190947 A1 Jul. 10, 2014

(51) Int. Cl.
*B23K 26/14* (2014.01)
*B23K 26/16* (2006.01)
*B23K 26/00* (2014.01)
*B23K 26/38* (2014.01)
*B23K 26/08* (2014.01)

(52) U.S. Cl.
CPC .............. *B23K 26/38* (2013.01); *B23K 26/0846* (2013.01)

(58) Field of Classification Search
CPC .. B23K 26/08; B23K 26/083; B23K 26/0838; B23K 26/0846; B23K 26/38

USPC ............... 219/121.6, 121.67, 121.69, 121.72, 219/121.76, 121.78–121.82
See application file for complete search history.

(56) References Cited

U.S. PATENT DOCUMENTS

| 4,782,208 | A | * | 11/1988 | Withrow | ............ | B23K 26/0846 |
|---|---|---|---|---|---|---|
| | | | | | | 219/121.18 |
| 2003/0127437 | A1 | * | 7/2003 | McLaughlin | ........ | B23K 26/382 |
| | | | | | | 219/121.67 |
| 2009/0107206 | A1 | * | 4/2009 | Thonig | ................ | B21D 43/287 |
| | | | | | | 72/405.09 |
| 2010/0122971 | A1 | * | 5/2010 | Caristan | ............. | B23K 26/0838 |
| | | | | | | 219/121.72 |
| 2010/0181165 | A1 | * | 7/2010 | Finn | ................... | B23K 26/0838 |
| | | | | | | 198/339.1 |

FOREIGN PATENT DOCUMENTS

DE 102004034256 A1 * 2/2006 ......... B23K 26/0846

OTHER PUBLICATIONS

Machine translation of DE 10 2004 034 256 A1, Hubert, R., Feb. 16, 2006.*

* cited by examiner

*Primary Examiner* — Dana Ross
*Assistant Examiner* — Lindsey C Teaters
(74) *Attorney, Agent, or Firm* — Manabu Kanesaka

(57) ABSTRACT

The invention relates to a method for producing a contour cut in a sheet metal web (BB) transported in a direction of transport (T) by means of a conveying apparatus (3). To accelerate the production of the contour cut, it is proposed in accordance with the invention to divide the sheet metal web (BB) into a plurality of overlapping processing strips and to assign successively two laser cutting units (10, 11) to at least two processing strips in the direction of transport (T).

24 Claims, 5 Drawing Sheets

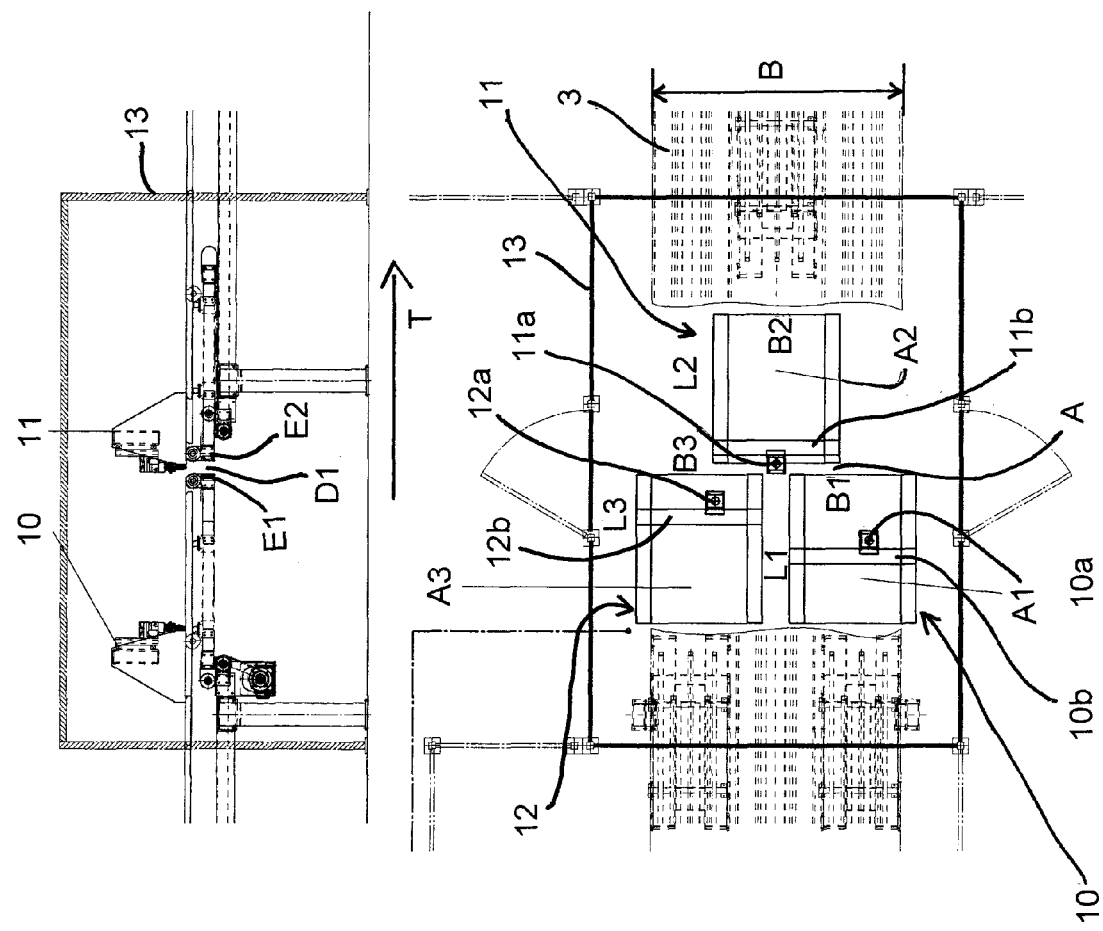

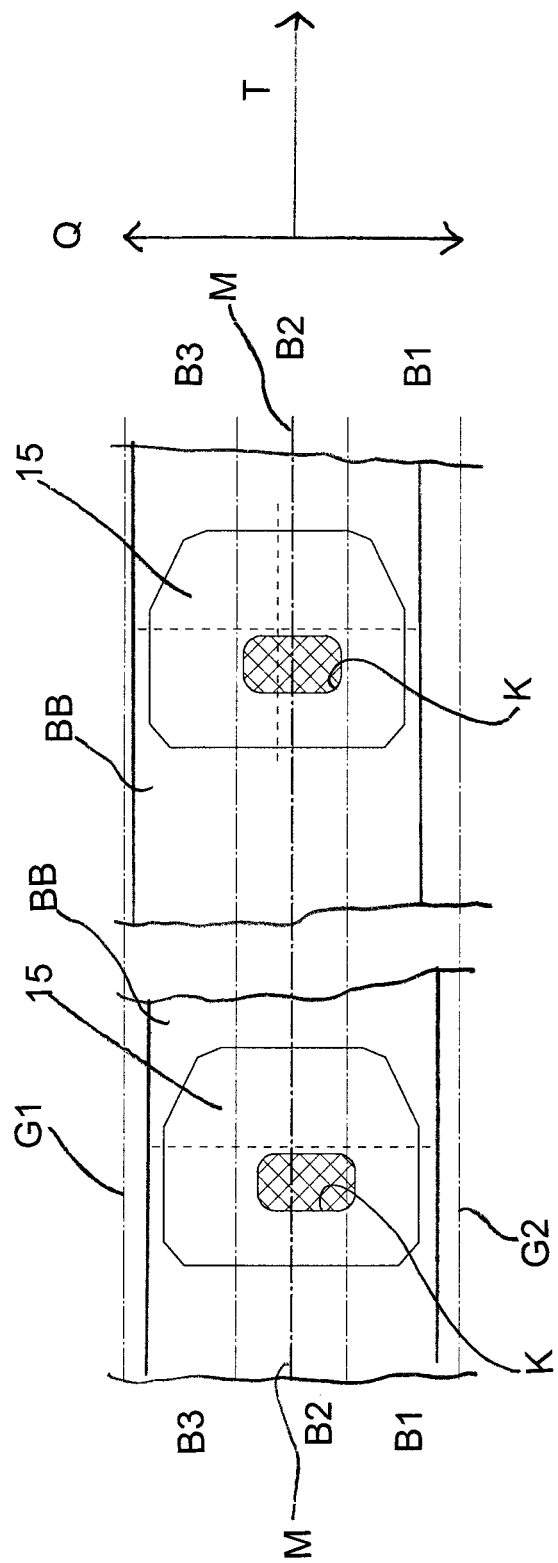

METHOD OF AND DEVICE FOR PRODUCING A CONTOUR CUT IN A STRIP OF SHEET METAL

The invention relates to a method and an apparatus for producing a contour cut in a sheet metal web transported in a direction of transport by means of a conveying apparatus.

DE 10 2004 034 256 B4 discloses an apparatus for cutting sheet metal. In this case, a sheet metal web is transported in a direction of transport by means of a conveying apparatus. The conveying apparatus has two transport devices arranged in succession in the direction of transport. An opening is formed between two mutually opposed ends of the transport devices. The mutually opposed ends of the transport devices can be moved in the same direction, either in or against the direction of transport. As a result, the opening can thus be adjusted in or against the direction of transport. A laser cutting device, of which the laser beam is always directed to the opening, is located above the opening. To produce an arbitrary cut in a sheet metal web transported on the conveying apparatus, the laser cutting device can be moved both in an X-direction corresponding to the direction of transport and perpendicularly thereto in a Y-direction. Here, the opening is always moved concurrently with the laser beam. To produce a plurality of different contour cuts, a plurality of laser cutting apparatuses of this type may also be arranged along the conveying apparatus at a distance from one another. A similar apparatus is also known from WO 2010/085486 A1.

With the known apparatuses, a contour cut is produced by each laser cutting device. In this case, a relatively long period of time is required to produce long and complicated contour cuts in particular. If a specific transport speed of the web is required, such a laser cutting unit must have a broad movement path in or against the direction of transport. This increases the overall size of the apparatus on the whole. At the same time, the production cost thereof therefore increases.

An object of the invention is to overcome the disadvantages according to the prior art. In particular a method will be specified, which can be carried out with an apparatus of compact construction and which at the same time enables rapid and precise production of long contour cuts in a sheet metal web. In accordance with a further objective of the invention, an apparatus that is constructed as compactly as possible will be specified, with which even long and complicated contour cuts can be produced in a sheet metal web at an improved speed.

In accordance with the invention, a method for producing a contour cut in a sheet metal web transported in a direction of transport by means of a conveying apparatus having the following steps is proposed:
dividing the sheet metal web over its width into at least two overlapping processing strips extending in the direction of transport, wherein a first processing strip has a first width and a second processing strip has a second width, wherein the first and the second width are each smaller than a width of the sheet metal web,
providing a first laser cutting device, which is assigned to the first processing strip and of which the first working region is defined by the first width and in the direction of transport by a first length,
providing a second laser cutting device, which is assigned to the second processing strip and of which the second working region adjoining the first working region either downstream or upstream is defined by the second width and in the direction of transport by a second length, and
controlling the first and the second laser cutting devices in such a way that at least one first partial cut of the contour cut is produced by means of the upstream laser cutting device, and in that at least one second partial cut remaining in order to finish the contour cut is produced consecutively by the downstream laser cutting device by continuing the first partial cut.

Since, in accordance with the invention, the first and the second laser cutting device each have a working region, which extends only over a partial region of the width of the sheet metal web, laser cutting units of the laser cutting devices can be moved quickly within the respective working region. Since the second working region of the second laser cutting device also adjoins the first working region of the first laser cutting device downstream in a substantially offset manner, a contour cut can be produced by at least two partial cuts, which are produced in succession by the first and the second laser cutting device. This enables the apparatus to be implemented in a particularly compact design. At the same time, the speed with which the contour cut is produced can be considerably increased. Whilst the second partial cut of a contour cut is produced by means of the downstream laser cutting device, a first partial cut of the next contour cut can already be produced again by the upstream laser cutting device.

In accordance with an advantageous embodiment of the invention, a first opening provided in the conveying apparatus is moved concurrently in line with a first laser beam radiated by the first laser cutting device, such that the first laser beam radiates through the first opening and a second opening provided in the conveying apparatus is moved concurrently in line with a second laser beam radiated by the second laser cutting device, such that the second laser beam radiates through the second opening. Since the first and second opening are moved concurrently, damage to the conveying apparatus caused by the laser beams is avoided. At the same time however, a sufficient support area for the sheet metal web is always provided by the conveying apparatus so that the contour cut can be produced precisely in accordance with its predefined course.

In accordance with a particularly advantageous embodiment of the invention, a method having the following steps is provided:
dividing the sheet metal web over its width into at least three processing strips extending in the direction of transport, in such a way that the second processing strip extends approximately centrally and at the edges overlaps the first and a third processing strip,
providing a third laser cutting device, which is assigned to the third processing strip and of which the third working region is defined by a third width and in the direction of transport by a third length, and wherein the second working region adjoins the third working region, either downstream or upstream,
controlling the first, second and third laser cutting devices in such a way that at least one first partial cut of the contour cut is produced by means of an upstream laser cutting unit, and in that at least one second partial cut remaining in order to finish the contour cut is produced consecutively by a downstream laser cutting unit by continuing the first partial cut.

With the proposed embodiment of the method, the first and the third working region may advantageously be arranged adjacently in a direction perpendicular to the direction of transport. In this case, they are separated from one another substantially by the second processing strip. The first and the third working region expediently have approximately the same length. With the proposed embodiment it is possible to produce first partial cuts simultaneously both in the first working region and in the third working region, said first partial cuts then being interconnected in the second working region, for example following downstream, by means of the second laser cutting device for example. A long contour cut can thus be produced quickly and easily. An apparatus for producing the contour cut can be kept particularly compact in this case.

The first and the second length of the working regions are given in particular from a maximum speed of movement of the laser cutting units within the working regions and from a desired web speed.

Within the context of the present invention, the word "adjoins" is understood to mean that the area of the second working region follows the area of the first and/or third working region, either downstream or upstream. In this case, a spacing may exist between the area of the second working region and the area of the first and/or third working region, either in or against the direction of transport. Such a spacing may be necessary in order to avoid a collision of the laser cutting devices. When using pivotable laser cutting devices, the spacing can also be avoided. The spacing may be 0 to 250 mm for example.

In accordance with a further embodiment of the invention, a third opening provided in the conveying apparatus is moved concurrently in line with the third laser beam, such that a third laser beam radiated by the third laser cutting device radiates through the third opening.

In accordance with a further particularly advantageous embodiment, the conveying apparatus comprises at least two transport devices arranged in succession in the direction of transport per processing strip. The mutually opposed ends of the transport devices can be displaced simultaneously, either in or against the direction of transport, by means of an adjustment device. A slit formed between the ends in this case forms the opening, through which the laser beam is guided. The adjustment device controls the movement of the mutually opposed ends so as to match the movements of the laser cutting device, thus ensuring that the laser beam radiates through the opening at all times. To this end, the adjustment device and the laser cutting device are controlled suitably by a common control device.

More specifically, corresponding to the first processing strip, the conveying apparatus may comprise a first transport device and a second transport device adjoining in the direction of transport, wherein the first opening is formed between a first end of the first transport device and an opposed second end of the second transport device, and wherein the concurrent movement of the first opening is produced by a movement in the same direction of the first and of the second end, either in or against the direction of transport. Corresponding to the second processing strip, the conveying apparatus may also comprise a third transport device arranged parallel to the first transport device and a fourth transport device arranged parallel to the second transport device, wherein the second opening is formed between the third end of the third transport device and an opposed fourth end of the fourth transport device, and wherein the concurrent movement of the second opening is produced by a movement in the same direction of the third and of the fourth end, either in or against the direction of transport. Corresponding to the third processing strip, the conveying apparatus may also comprise a fifth transport device arranged parallel to the third transport device and a sixth transport device arranged parallel to the fourth transport device, wherein the third opening is formed between the fifth end of the fifth transport device and an opposed sixth end of the sixth transport device, and wherein the concurrent movement of the third opening is produced by a movement in the same direction of the fifth and of the sixth end, either in or against the direction of transport.

With the proposed embodiment, it is ensured that the laser cutting devices can carry out any movements independently of one another in their respective working region, wherein damage to the conveying apparatus caused by the laser beams penetrating the sheet metal web is simultaneously avoided.

The sheet metal web is advantageously moved continuously in the direction of transport. In particular, the sheet metal web can be moved in the direction of transport with a substantially constant speed of transport. The movement of the sheet metal web in the direction of transport is likewise controlled by a control device, which controls the concurrent movements of the openings as well as the movements of the laser cutting devices.

In accordance with a further advantageous embodiment, a first curve deviating from a predefined contour of the contour cut is cut at one end of the first partial cut when producing the contour cut. The second partial cut may be started before an end of the first partial cut and may be guided in a second curve running toward the predefined contour. It is thus ensured that a continuous connection is produced between the first and the second partial cut. Due to the proposed curves, deviating from the predefined contour, at the end of the first partial cut and at the start of the second partial cut, both partial cuts always cross one another.

The term "contour cut" is understood to mean a cut that gives the sheet metal web a different shape. A contour cut may be straight, curved or closed. A "contour" or a course of the contour cut is predefined. It is produced by a programmed movement of the laser cutting units in the respective working region.

In accordance with a further advantageous embodiment, a transverse position of the sheet metal web running transversely relative to the direction of transport is set such that the contour cut can be produced with a minimal number of partial cuts. The term "transverse position" is understood to mean a position of one of the edges of the sheet metal web with respect to the working regions, fixed relative thereto, of the laser cutting devices. By changing the transverse position of the sheet metal web, said sheet metal web can thus be adjusted relative to the working regions transverse to the direction of transport. A predefined contour cut can thus be produced with a minimal number of partial cuts. For example, it may be that, with a central alignment of the sheet metal web with respect to the working regions, a predefined contour cut can only be produced with use of three laser cutting units, but with use of just two laser cutting units simply with a suitable adjustment of the centre of the web transverse to the direction of transport. The programming effort for producing a contour cut can thus be reduced and the quality of the contour cut can thus be improved. If one of the laser cutting units fails, the sheet metal web may possibly be displaced transversely to the direction of transport such that the desired contour can still be produced with the functioning, remaining laser cutting units. This increases the process reliability.

Furthermore, if two laser cutting units are necessary to produce a contour, the partial cuts produced by the laser cutting units may advantageously lie in the region of a corner of the contour by displacing the sheet metal web transversely to the direction of transport. It may thus potentially be possible to dispense with a necessary postprocessing step in the region in which the partial cuts meet one another.

The proposed change to the transverse position of the sheet metal web is of course only possible with those sheet metal webs of which the width is smaller than a total width of the working regions.

In accordance with the invention, an apparatus for producing a contour cut in a sheet metal web is also provided, with a conveying apparatus for transporting the sheet metal web in a direction of transport, wherein the sheet metal web is divided over its width into at least two overlapping processing strips extending in the direction of transport, wherein a first processing strip has a first width and a second processing strip has a second width, wherein the first and the second width are each smaller than a width of the sheet metal web, with a first laser cutting device, which is assigned to the first processing strip and of which the first working region is defined by the first width and in the direction of transport by a first length, with a second laser cutting device, which is assigned to the second processing strip and of which the second working region adjoining the first working region downstream or upstream is defined by the second width and in the direction of transport by a second length, and with a control device for controlling the first and the second laser cutting devices in such a way that at least one first partial cut of the contour cut is produced by means of the upstream laser cutting device, and in that at least one second partial cut remaining in order to finish the contour cut is produced consecutively by the downstream laser cutting device by continuing the first partial cut.

The proposed apparatus enables effective production of one or more contour cuts in a sheet metal web. In this case, a length of the apparatus in the direction of transport can be kept relatively small. Due to the proposed arrangement of the working regions of the laser cutting devices and of the control device thereof, a second partial cut of a contour cut can be made at the same time as a first partial cut of a subsequent contour cut.

In accordance with an advantageous embodiment, a first opening-moving device for concurrently moving a first opening provided in the conveying apparatus in line with a first laser beam radiated by the first laser cutting device is provided, such that the first laser beam radiates through the first opening, wherein a second opening-moving device for concurrently moving a second opening provided in the conveying apparatus in line with a second laser beam radiated by the second laser cutting device is provided, such that the second laser beam radiates through the second opening. With the proposed embodiment of the conveying apparatus, damage to said apparatus caused by the laser beams produced by the laser cutting device can be avoided.

In accordance with a further embodiment, the sheet metal web is divided over its width into at least three processing strips extending in the direction of transport, in such a way that the second processing strip extends approximately centrally and at the edges overlaps the first and a third processing strip having a third width, wherein a third laser cutting device is provided, which is assigned to the third processing strip and of which the third working region is defined by the third width and in the direction of transport by a third length, and wherein the second working region adjoins the third working region downstream or upstream. The first and the third working regions may be arranged adjacently. The second working region may adjoin the first and the third working region, either downstream or upstream, such that the three working regions overlap over their width. In this case, the second working region may be distanced from the first and third working region with a spacing from 0 to 250 mm, either in or against the direction of transport.

The first, second and third laser cutting device are expediently controlled by the control device in such a way that at least one first partial cut of the contour cut is produced with an upstream laser cutting unit, and at least one second partial cut remaining in order to finish the contour cut is produced consecutively by a downstream laser cutting unit by continuing the first partial cut. The provision of three laser cutting devices, of which at least one is arranged downstream of the other laser cutting devices, and the provision of the width of the respective working regions limited to the processing strips mean that a speed for producing a contour cut can be considerably increased.

The control device may be a conventional, programmable process computer control or a computer having a suitable control program.

An opening-moving device for concurrently moving a third opening provided in the conveying apparatus in line with the third laser beam is expediently provided, such that a third laser beam radiated by the third laser cutting device radiates through the third opening.

In accordance with an advantageous embodiment, an adjustment device for adjusting a spool receiving the sheet metal web is provided in a transverse direction running transversely to the direction of transport. For example, the spool may be guided on rails running transversely to the direction of transport and may be adjustable in the transverse direction by means of an electric motor. The adjustment device expediently additionally comprises a lateral web guide adjustable in the transverse direction. Such a lateral web guide enables particularly precise adjustment of the sheet metal web with regard to the working regions.

A transverse position of the sheet metal web can expediently be set by means of the adjustment device such that the contour cut can be produced with a minimal number of partial cuts. To this end, the adjustment device can be adjusted automatically into a suitable transverse position by means of the control device.

In accordance with a further embodiment of the invention, a regulation device for regulating the transport speed is provided. A predefined transport speed can thus be kept constant.

Reference is made to the foregoing with regard to the advantages and the further embodiments of the conveying apparatus.

Exemplary embodiments of the invention will be explained in greater detail hereinafter on the basis of the drawing, in which:

FIG. 3 shows a detail according to FIG. 1,

FIG. 4 shows a side view according to FIG. 3,

FIG. 9 shows a plan view of contour cut lines of a centrally guided sheet metal web, and FIG. 10 shows a plan view according to FIG. 9, wherein the sheet metal web is set to a deviating transverse position.

Figure 2:
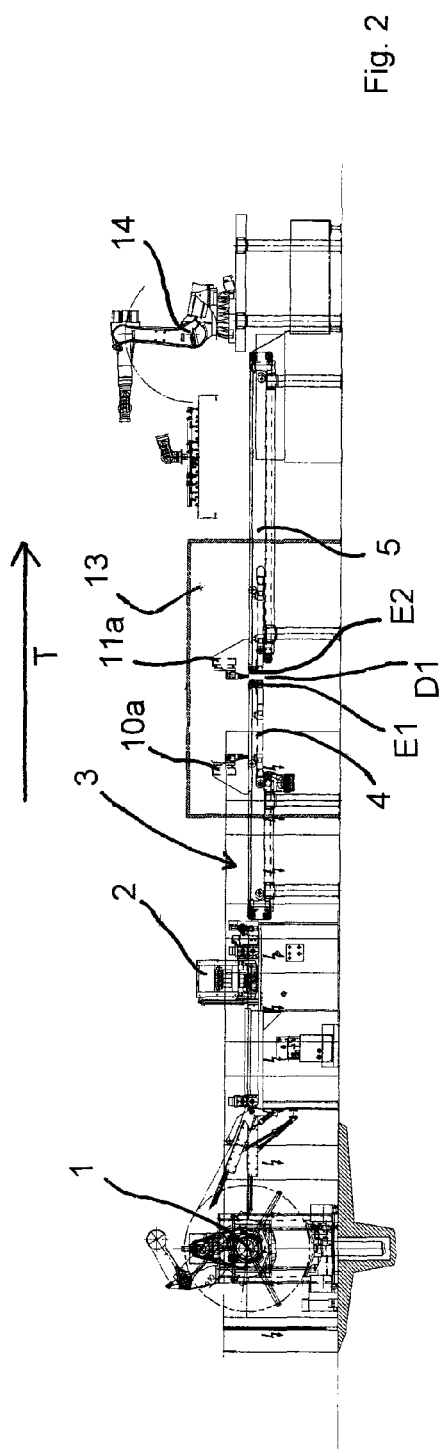
FIG. 2 shows a side view according to FIG. 1.

FIGS. 1 to 4 show an apparatus for producing a contour cut in a sheet metal web or for producing sheet metal plates having a predefined shape. Reference sign 1 denotes a spool, which is used to receive a sheet metal web (not shown here) provided in the form of a reel or a coil. A roll-guiding device 2 is located downstream of the spool 1. Reference sign 3 generally denotes a conveying apparatus. The conveying apparatus 3 comprises a first transport device 4, which is followed in a downstream direction, that is to say in a direction of transport T, by a second transport device 5. A first opening D1, which has the form of a slit, is formed between a first end E1 of the first transport device 4 and a second end E2 of the second transport device 5.

The first 4 and the second transport device 5 are in this case formed in the manner of conveying belts. The first end E1 and the second end E2 of the transport devices 4, 5 can be moved to and fro in the same direction, both in and against a direction of transport T. To this end, an opening-moving device or adjustment device (not shown here in greater detail) is provided. In a similar embodiment, the conveying apparatus 3 comprises a third transport device 6 arranged parallel to the first transport device 4 and a fourth transport device 7 arranged parallel to the second transport device 5. A fifth transport device 8 and a sixth transport device 9 are again arranged parallel, this time parallel to the third transport device 6. Mutually opposed ends (not shown here in detail) of the third to sixth transport apparatus 6, 7, 8, 9 can be moved to and fro by means of the adjustment device, either in or against the direction of transport T, similarly to the first end E1 and second end E2. A second opening (not shown here) formed between the third transport device 6 and the fourth transport device 7 as well as a third opening (not shown here) formed between the fifth transport device 8 and the sixth transport device 9 can thus be moved independently of one another.

Reference sign 10 denotes a first laser cutting device, reference sign 11 denotes a second laser cutting device arranged downstream, and reference sign 12 denotes a third laser cutting device 12 arranged beside the first laser cutting device 10. The laser cutting devices 10, 11, 12 are surrounded by a protective housing 13. A robot 14, with which the sheet metal plates 15 cut from the sheet metal web are stacked to form transport stacks, is located downstream of the conveying apparatus 3.

Figure 1:
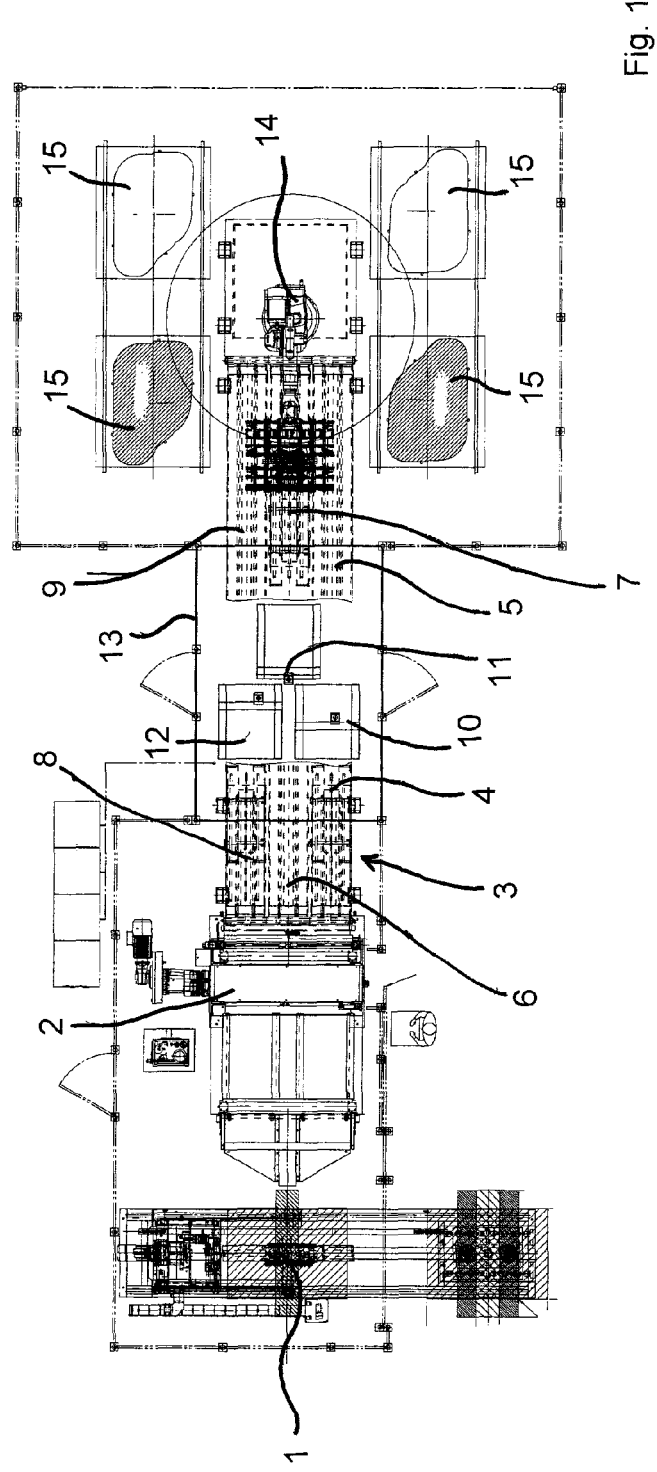
FIG. 1 shows a plan view of an apparatus for producing a sheet metal plate.

FIGS. 3 and 4 show details of FIGS. 1 and 2. Each of the laser cutting devices 10, 11, 12 has a respective laser cutting unit 10*a*, 11*a*, 12*a*, which are each received on a slide 10*b*, 11*b*, 12*b* movable to and fro in the direction of transport T. Furthermore, each of the laser cutting units 10*a*, 11*a*, 12*a* is movable perpendicularly to the direction of transport T on the respective slide 10*b*, 11*b*, 12*b*.

The first laser cutting unit 10*a* is movable in a first working region A1, which has a first width B1 and a first length L1. A third working region A3, located alongside, of the third laser cutting unit 12 has a third length L3, which in this case corresponds to the first length L1, as well as a third width B3. The first width B1 and the third width B3 may be of equal size.

A second working region A2 of the second laser cutting unit 11*a* arranged approximately centrally with regard to the conveying apparatus 3 is located downstream of the first working region A1 and the third working region A3. The second working region A2 has a second length L2 and a second width B2.

The first width B1, the second width B2, and the third width B3 are each smaller than a width B of a sheet metal web or the conveying apparatus 3. As can be seen in FIG. 3, the first width B1 and the third width B3 are selected such that they overlap with the second width B2 of the second working region A2 arranged downstream. The second working region A2 is distanced from the first working region A1 and third working region A3 in the direction of transport T by a small spacing A.

The method that can be carried out with the apparatus will now be explained in greater detail, in particular on the basis of FIGS. 5 to 8.

Figure 5:
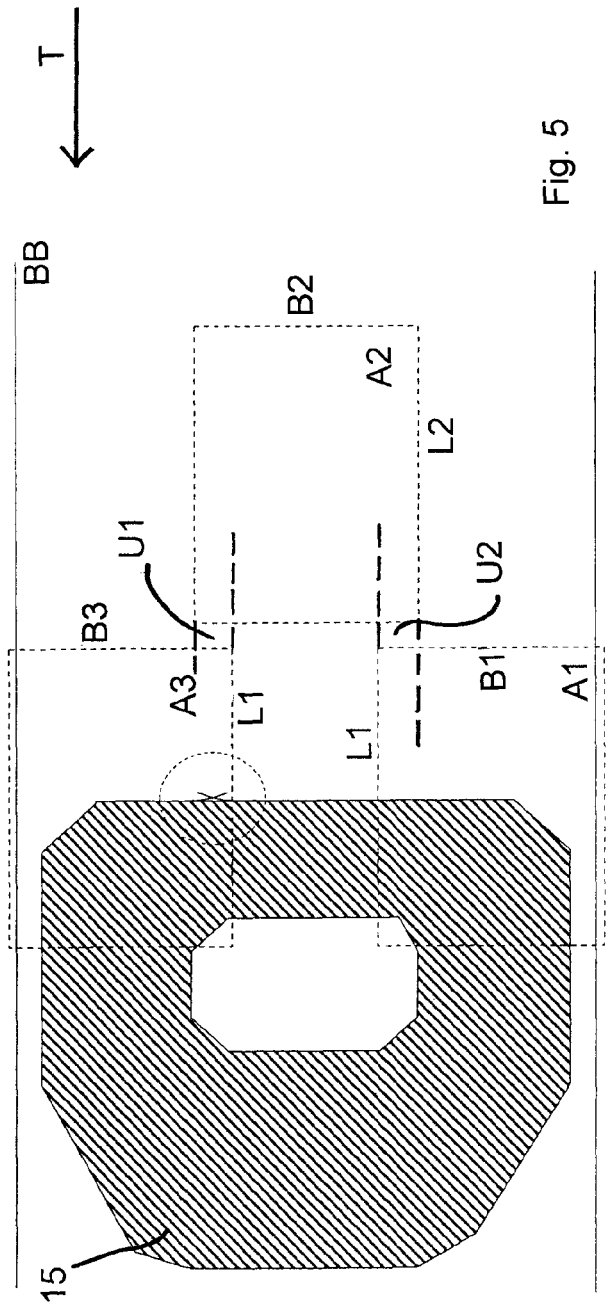
FIG. 5 shows a schematic plan view of a sheet metal web with a contour cut.

In the exemplary embodiment shown in FIG. 5 the second working region A2 arranged approximately centrally with regard to the sheet metal web BB is arranged upstream of the first working region A1 and the third working region A3. Similarly to the previous exemplary embodiment, the sheet metal web BB is also again divided in this case into three processing strips, of which the widths correspond to the first width B1 of the first working region A1, the second width B2 of the second working region A2, and the third width B3 of the third working region A3. The processing strips overlap at the edges. An overlapping region at the edges is denoted by reference sign U1 and U2.

To produce the sheet metal plate 15 shown in FIG. 5, the sheet metal web BB is first guided through the second working region A2. In doing so, the second laser cutting unit 11*a* produces the partial cuts falling within the second processing strip, a first partial cut being denoted in FIGS. 6 and 7 by T1. At its end, the first partial cut T1 has a first curve Bo1 deviating slightly from the desired contour.

The sheet metal web BB then reaches the first working region A1 and the third working region A3. In doing so, a second partial cut denoted by reference sign T2 is produced with the third laser cutting unit 11*a* for example and is started with a second curve Bo2 deviating slightly from the desired contour.

Figure 6:
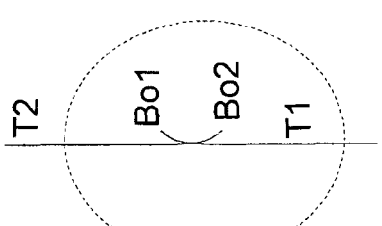
FIG. 6 shows an enlarged detail according to FIG. 5.

In the detail shown in FIG. 6, the second partial cut T2 continues the desired straight contour exactly.

Figure 7:
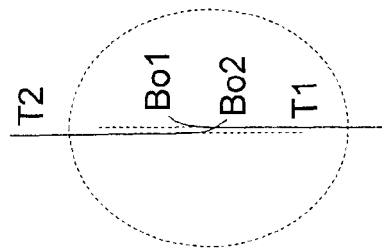
FIG. 7 shows a variant according to FIG. 6.

As can be seen from FIG. 7, it is ensured that the first partial cut T1 and the second partial cut T2 are interconnected, even in the event of an offset, by the fact that the first partial cut T1 terminates with a first curve Bo1 and the second partial cut T2 starts with a second curve Bo2. The sheet metal plate 15 can thus be separated reliably and completely from the remaining components of the sheet metal web BB.

Figure 8:
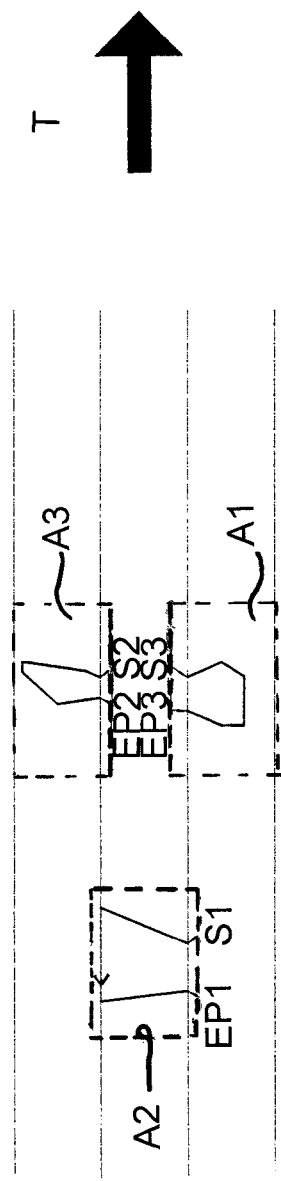
FIG. 8 shows a schematic view of the course of movement of laser cutting units.

FIG. 8 shows an example of the course of movement of a first laser cutting unit 10*a*, second laser cutting unit 11*a* and third laser cutting unit 12*a*, as is necessary to produce the sheet metal plate 15 shown. In this case, the second, working region A2 is again located upstream of the first working region A1 and the third working region A3. The path of movement visible in FIG. 8 and running from a first starting point S1 to a first end point EP1 is travelled by the second laser cutting unit 11*a* located in the second working region A2. At the same time, the further paths of movement denoted by the starting points S2 and S3 are travelled downstream simultaneously in the first working region A1 and third working region A3 by the first laser cutting unit 10*a* and the third laser cutting unit 12*a*. The contour shown to the left in FIG. 8 can thus be produced quickly and efficiently.

With the proposed method, it is possible to move the sheet metal web BB at a constant speed in the direction of transport T, for example at a speed in the range from 5 to 100 m/min, preferably 20 to 50 m/min. The laser cutting units 10*a*, 11*a*, 12*a* can be moved with a speed in the range from 20 to 60 m/min. For example, a specific web speed may be predefined first in order to control the apparatus. The movements of the laser cutting units 10*a*, 11*a*, 12*a* can then be calculated with a predefined contour of the sheet metal plates 15.

FIGS. 9 and 10 show the advantageous effects of an adjustment of the sheet metal web BB in a transverse direction Q running perpendicularly to the direction of transport T on the basis of an example.

In the example shown in FIG. 9, the sheet metal web BB is arranged centrally with regard to the outer boundaries G1, G2 of the working regions of the laser cutting devices 10, 11, 12. A central axis M running centrally between the boundaries G1, G2 coincides with a further central axis (not shown here) of the sheet metal web BB. In the example shown in FIG. 9, an inner contour K falls within the first and second working region of the first and second laser cutting device (not shown here) given by the first width B1 and the second width B2. In other words, the inner contour K has to be cut in this case by the cooperation of two laser cutting units.

In the example shown in FIG. 10, the sheet metal web BB is adjusted in the transverse direction Q with regard to the outer boundaries G1, G2, such that the inner contour K falls merely in the second working region defined by the second width B2. As a result, the inner contour K can be produced merely by the action of the second laser cutting device (not shown here). The programming effort for producing the inner contour K can thus be reduced, the shape of the inner contour K can be improved, and the process reliability can also be increased.

LIST OF REFERENCE SIGNS 1 spool
2 roll-guiding apparatus
3 conveying apparatus
4 first transport device
5 second transport device
6 third transport device
7 fourth transport device
8 fifth transport device
9 sixth transport device
10 first laser cutting device
10a first laser cutting unit
10b first slide
11 second laser cutting device
11a second laser cutting unit
11b second slide
12 third laser cutting device
12a third laser cutting unit
12b third slide
13 protective housing
14 robot
15 sheet metal plate
A spacing
A1 first working region
A2 second working region
A3 third working region
B width
BB sheet metal web
Bo1 first curve
Bo2 second curve
B1 first width
B2 second width
B3 third width
D1 first opening
EP1 first end point
EP2 second end point
EP3 third end point
E1 first end
E2 second end
G1, G2 outer boundaries
K inner contour
L1 first length
L2 second length
L3 third length
M central axis
Q transverse direction
S1 first starting point
S2 second starting point
S3 third starting point
T direction of transport
T1 first partial cut
T2 second partial cut
U1 first overlapping region
U2 second overlapping region

The invention claimed is:

1. A method for producing a contour cut in a sheet metal web transported in a direction of transport by means of a conveying apparatus having the following steps:
dividing the sheet metal web over its width into at least two overlapping processing strips extending in the direction of transport, wherein a first processing strip has a first width and a second processing strip has a second width, wherein the first width and the second width are each smaller than a width of the sheet metal web,
providing a first laser cutting device, which is assigned to the first processing strip and of which a first working region is defined by the first width and in the direction of transport by a first length,
providing a second laser cutting device, which is assigned to the second processing strip and of which a second working region adjoining the first working region either downstream or upstream is defined by the second width and in the direction of transport by a second length, and
controlling the first laser cutting device and the second laser cutting device in such a way that at least one first partial cut of the contour cut is produced by means of the first laser cutting device, and in that at least one second partial cut remaining in order to finish the contour cut is produced consecutively by the second laser cutting device by continuing the first partial cut.

2. The method according to claim 1, wherein a first opening provided in the conveying apparatus is moved concurrently in line with a first laser beam radiated by the first laser cutting device, such that the first laser beam radiates through the first opening, and wherein a second opening provided in the conveying apparatus is moved concurrently in line with a second laser beam radiated by the second laser cutting device, such that the second laser beam radiates through the second opening.

3. The method according to claim 1, having the following steps:
dividing the sheet metal web over its width into at least three processing strips extending in the direction of transport, in such a way that the second processing strip extends approximately centrally and at the edges overlaps the first and a third processing strip,
providing a third laser cutting device, which is assigned to the third processing strip and of which a third working region is defined by a third width and in the direction of transport by a third length, and wherein the second working region adjoins the third working region, either downstream or upstream,
controlling the first, second and third laser cutting devices in such a way that at least one first partial cut of the contour cut is produced by means of the third laser cutting device, and in that at least one second partial cut remaining in order to finish the contour cut is produced consecutively by a downstream laser cutting unit by continuing the first partial cut.

4. The method according to claim 3, wherein a third opening provided in the conveying apparatus is moved concurrently in line with a third laser beam, such that the third laser beam radiated by the third laser cutting device radiates through the third opening.

5. The method according to claim 1, wherein, corresponding to the first processing strip, the conveying apparatus comprises a first transport device and a second transport device adjoining in the direction of transport, wherein the first opening is formed between a first end of the first transport device and an opposed second end of the second transport device, and wherein the concurrent movement of the first opening is produced by a movement in the same direction of the first end and of the second end, either in or against the direction of transport.

6. The method according to claim 1, wherein, corresponding to the second processing strip, the conveying apparatus comprises a third transport device arranged parallel to the first transport device and a fourth transport device arranged parallel to the second transport device, wherein the second opening is formed between a third end of the third transport device and an opposed fourth end of the fourth transport device, and wherein the concurrent movement of the second opening is produced by a movement in the same direction of the third end and of the fourth end, either in or against the direction of transport.

7. The method according to claim 6, wherein, corresponding to the third processing strip, the conveying apparatus comprises a fifth transport device arranged parallel to the third transport device and a sixth transport device arranged parallel to the fourth transport device, wherein the third opening is formed between a fifth end of the fifth transport device and an opposed sixth end of the sixth transport device, and wherein the concurrent movement of the third opening is produced by a movement in the same direction of the fifth end and of the sixth end, either in or against the direction of transport.

8. The method according to claim 1, wherein the sheet metal web is moved continuously in the direction of transport.

9. The method according to claim 1, wherein the sheet metal web is moved in the direction of transport with a substantially constant speed of transport.

10. The method according to claim 1, wherein, when producing the contour cut, a first curve deviating from a predefined contour of the contour cut is cut at one end of the first partial cut.

11. The method according to claim 1, wherein the second partial cut is started before one end of the first partial cut and is guided in a second curve running toward the predefined contour.

12. The method according to claim 1, wherein a transverse position of the sheet metal web running transversely to the direction of transport is set such that the contour cut can be produced with a minimum number of partial cuts.

13. An apparatus for producing a contour cut in a sheet metal web, comprising:
a conveying apparatus for transporting the sheet metal web in a direction of transport, wherein the sheet metal web is divided over its width into at least two overlapping processing strips extending in the direction of transport, wherein a first processing strip has a first width and a second processing strip has a second width, wherein the first width and the second width are each smaller than a width of the sheet metal web,
a first laser cutting device, which is assigned to the first processing strip and of which a first working region is defined by the first width and in the direction of transport by a first length,
a second laser cutting device, which is assigned to the second processing strip and of which a second working region adjoining the first working region downstream or upstream is defined by the second width and in the direction of transport by a second length, and
a control device for controlling the first and second laser cutting devices in such a way that at least one first partial cut of the contour cut is produced by means of the first laser cutting device, and in that at least one second partial cut remaining in order to finish the contour cut is produced consecutively by the second laser cutting device by continuing the first partial cut.

14. The apparatus according to claim 13, wherein a first opening-moving device for concurrently moving a first opening provided in the conveying apparatus in line with a first laser beam radiated by the first laser cutting device is provided, such that the first laser beam radiates through the first opening, and wherein a second opening-moving device for concurrently moving a second opening provided in the conveying apparatus in line with a second laser beam radiated by the second laser cutting device is provided, such that the second laser beam radiates through the second opening.

15. The apparatus according to claim 13, wherein the sheet metal web is divided over its width into at least three processing strips extending in the direction of transport, in such a way that the second processing strip extends approximately centrally and at the edges overlaps the first processing strip and a third processing strip having a third width, and wherein a third laser cutting device is provided, which is assigned to the third processing strip and of which a third working region is defined by the third width and in the direction of transport by a third length, and wherein the second working region adjoins the third working region, either downstream or upstream.

16. The apparatus according to claim 15, wherein the first, second, and third laser cutting device are controlled by the control device in such a way that at least one first partial cut of the contour rut is produced with the third laser cutting device, and in that at least one second partial cut remaining in order to finish the contour cut is produced by the second laser cutting device by continuing the first partial cut.

17. The apparatus according to claim 15, wherein an opening-moving device for concurrently moving a third opening provided in the conveying apparatus in line with a third laser beam is provided, such that the third laser beam radiated by the third laser cutting device radiates through the third opening.

18. The apparatus according to claim 15, wherein, corresponding to the third processing strip, the conveying apparatus comprises a fifth transport device arranged parallel to the third transport device and a sixth transport device arranged parallel to the fourth transport device, wherein the third opening is formed between a fifth end of the fifth transport device and an opposed sixth end of the sixth transport device, and wherein the concurrent movement of the third opening is caused by a movement in the same direction of the fifth end and of the sixth end, in or against the direction of transport, produced by means of the third opening-moving device.

19. The apparatus according claim 13, wherein, corresponding to the first processing strip, the conveying apparatus comprises a first transport device and a second transport device adjoining in the direction of transport, wherein the first opening is formed between a first end of the first transport device and an opposed second end of the second transport device, and wherein the concurrent movement of the first opening is caused by a movement in the same direction of the first end and of the second end, either in or against the direction of transport, produced by means of the first opening-moving device.

20. The apparatus according to claim 13, wherein, corresponding to the second processing strip, the conveying apparatus comprises a third transport device arranged parallel to the first transport device and a fourth transport device arranged parallel to the second transport device, wherein the second opening is formed between a third end of the third transport device and an opposed fourth end of the fourth transport device, and wherein the concurrent movement of the second opening is caused by a movement in the same direction of the third end and of the fourth end, in or against the direction of transport, produced by means of the second opening-moving device.

21. The apparatus according to claim 13, wherein a regulation device for regulating the speed of transport is provided.

22. The apparatus according to claim 13, wherein an adjustment device for adjusting a spool receiving the sheet metal web is provided in a transverse direction running transversely to the direction of transport.

23. The apparatus according to claim 22, wherein the adjustment device comprises a lateral web guide adjustable in the transverse direction.

24. The apparatus according to claim 23, wherein a transverse position of the sheet metal web can be set by means of the adjustment device such that the contour cut can be produced with a minimal number of partial cuts.

* * * * *